(12) United States Patent
Tanaka et al.

(10) Patent No.: US 7,217,106 B2
(45) Date of Patent: May 15, 2007

(54) ELECTRO-HYDRAULIC POWER STEERING APPARATUS

(75) Inventors: Toshinori Tanaka, Tokyo (JP); Keiichi Fukazawa, Tokyo (JP); Yuusuke Matsui, Tokyo (JP); Kyouhei Yamamoto, Tokyo (JP); Katsumi Ohata, Tokyo (JP); Kengo Fujimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/743,726

(22) Filed: Dec. 24, 2003

(65) Prior Publication Data

US 2004/0134708 A1    Jul. 15, 2004

(30) Foreign Application Priority Data

Dec. 27, 2002    (JP) .................. P. 2002-379149

(51) Int. Cl.
*F04B 17/00*    (2006.01)
(52) U.S. Cl. ............................. 417/410.1; 417/410.3; 180/443
(58) Field of Classification Search ............... 180/443, 180/444, 446, 417; 74/388 PS, 409, 410, 74/424.6, 424.7, 424.71, 425; 417/410.1–410.5, 417/373, 415
See application file for complete search history.

(56) References Cited

U.S. PATENT DOCUMENTS

| 2,506,404 | A | | 5/1950 | Woodfield et al. |
| 2,543,647 | A | | 2/1951 | Stark et al. |
| 3,261,997 | A | | 7/1966 | Seyfried |
| 5,281,013 | A | | 1/1994 | Pichon et al. |
| 5,360,322 | A | * | 11/1994 | Henein et al. ............... 417/313 |
| 5,591,019 | A | * | 1/1997 | Brown ......................... 417/422 |
| 5,964,582 | A | * | 10/1999 | Kobayashi et al. ..... 417/423.12 |
| 6,044,723 | A | * | 4/2000 | Eda et al. ................. 74/388 PS |
| 6,447,271 | B2 | * | 9/2002 | Ojima et al. ............. 417/410.4 |
| 6,523,431 | B2 | * | 2/2003 | Ozsoylu et al. ................ 74/443 |
| 6,550,567 | B2 | * | 4/2003 | Murakami et al. ........... 180/444 |
| 6,561,306 | B2 | * | 5/2003 | Watanabe et al. ............ 180/444 |
| 6,763,738 | B1 | * | 7/2004 | Tsutsui et al. ........... 74/388 PS |
| 6,779,990 | B2 | * | 8/2004 | Sekihara et al. ............. 417/415 |

FOREIGN PATENT DOCUMENTS

| DE | 41 25 636 | A1 | 2/1993 |
| DE | 42 24 980 | A1 | 2/1994 |
| DE | 100 42 106 | A1 | 3/2002 |
| JP | 60-154622 | | 10/1985 |
| JP | 6-60270 | | 8/1994 |
| JP | 9-68173 | | 3/1997 |
| JP | 10-082377 | A | 3/1998 |
| JP | 11-43062 | | 2/1999 |
| JP | 11-252851 | A | 9/1999 |
| JP | 11-294345 | | 10/1999 |
| JP | 2000-18173 | | 1/2000 |
| JP | 2000-166169 | A | 6/2000 |
| JP | 2001-199355 | A | 7/2001 |

* cited by examiner

*Primary Examiner*—Lesley D. Morris
*Assistant Examiner*—L. Lum
(74) *Attorney, Agent, or Firm*—Sughrue Mion, PLLC

(57) ABSTRACT

An electro-hydraulic power steering apparatus includes: a motor having a rotational shaft and provided with a bearing for rotatably bearing the rotational shaft; a hydraulic pump disposed at one end of the rotational shaft of the motor and driven by the motor; a first elastic body for supporting the bearing; and a second elastic body for pressing the bearing in an axial direction.

7 Claims, 4 Drawing Sheets

ELECTRO-HYDRAULIC POWER STEERING APPARATUS

BACKGROUND OF THE INVENTION

1. Field of the Invention

The present invention relates to an electro-hydraulic power steering apparatus having a hydraulic pump driven by a motor.

2. Background Art

The conventional electric power steering apparatus decelerates a rotational output of an electric motor to become an auxiliary steering torque and transmits it to an output shaft of a hand steering gear, assisting a manual steering effort applied to a steering wheel to turn the wheels. In the conventional electric power steering apparatus motor, a disc spring for applying a pre-load to the rotational shaft along the shaft center in a direction toward the bearing is held between an outer ring portion of bearing and a yoke bearing housing. Also, in the conventional electric power steering apparatus, the motor has a motor housing composed of a receiving portion of concave shape for receiving the bearing at the opposite end of the output side and a yoke, with a vibration absorbing material interposed between the bearing received in the receiving portion and the receiving portion (e.g., refer to JP-A-11-252851, paragraphs [0002] to [0004], [0014], FIG. 7A, FIG. 1). Moreover, some of the conventional electric pumps had a noise damper barrel communicating to a discharge chamber or an elastic body in a drive joint (e.g., refer to JP-A-10-82377 paragraphs [0014], [0018], FIG. 1, FIG. 8).

In the conventional electro-hydraulic power steering apparatus, although the bearing for rotatably bearing the rotational shaft was supported via the elastic body, the bearing was not pressed in the axial direction by the elastic body. Accordingly, there was a problem that a great noise was produced from the electro-hydraulic power steering apparatus, especially under the influence of pulsating hydraulic pressures of the hydraulic pump driven by the rotational shaft.

SUMMARY OF THE INVENTION

This invention has been achieved to solve the above-mentioned problem, and it is an object of the invention to provide an electro-hydraulic power steering apparatus with a simple constitution, cheaply and with low noise, including effective noise reducing means that is suitable for the electro-hydraulic power steering apparatus.

To achieve the object, the invention provides an electro-hydraulic power steering apparatus including: a motor having a rotational shaft and provided with a bearing for rotatably bearing the rotational shaft; a hydraulic pump disposed at one end of the rotational shaft of the motor and driven by the motor; a first elastic body for supporting the bearing; and a second elastic body for pressing the bearing in an axial direction.

BRIEF DESCRIPTION OF THE DRAWINGS

The present invention may be more readily described with reference to the accompanying drawings.

DETAILED DESCRIPTION OF THE PREFERRED EMBODIMENTS

Embodiment 1

Figure 1:
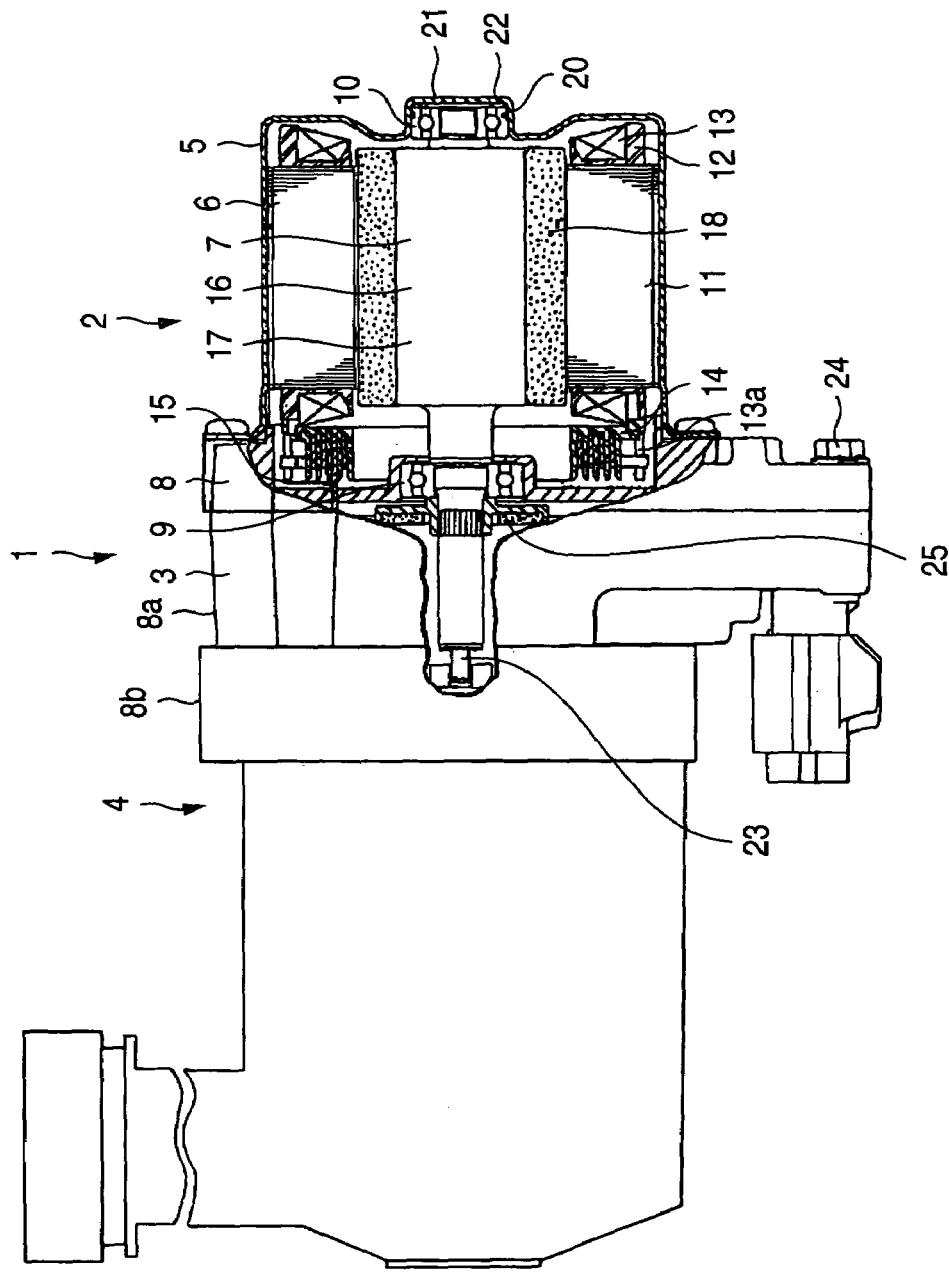
FIG. 1 is a cross-sectional view of the primary portion of an electro-hydraulic power steering apparatus according to an embodiment 1 of the present invention.
Figure 2:
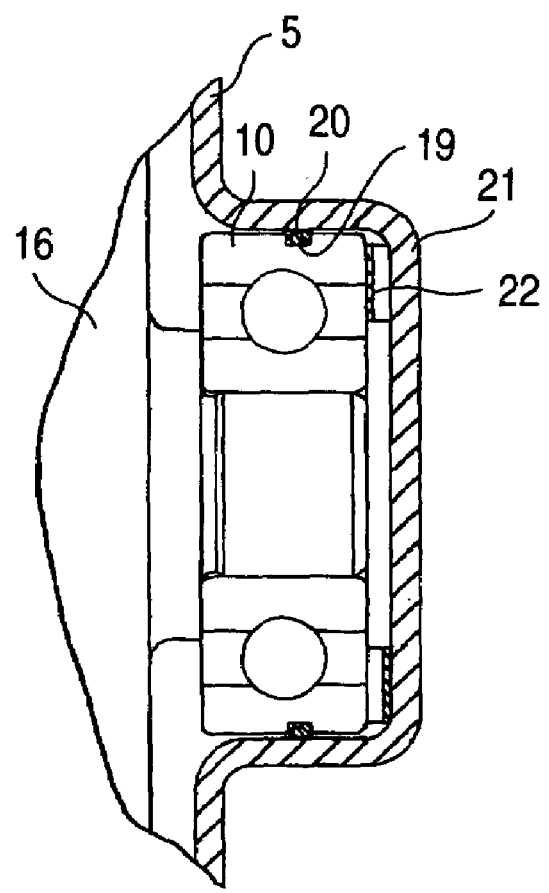
FIG. 2 is a cross-sectional view of the primary portion near a bearing on the opposite side of a hydraulic pump according to the embodiment 1 of the invention.
Figure 3A:
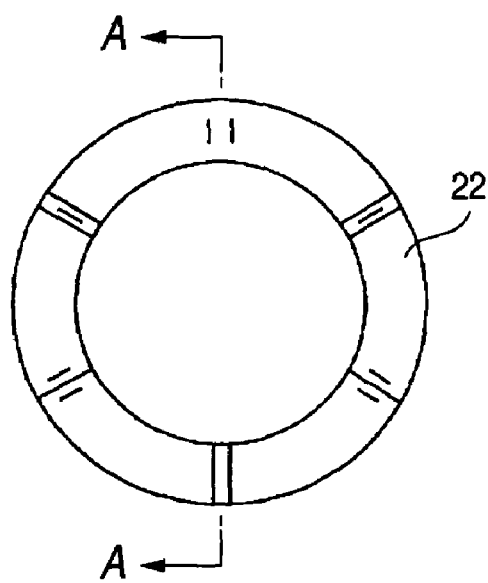
FIGS. 3A and 3B are a front view and a cross-sectional view of a wave washer according to the embodiment 1 of the invention.
Figure 3B:

An embodiment 1 of the present invention will be described below with reference to the accompanying drawings. FIG. 1 is a cross-sectional view of an electro-hydraulic power steering apparatus. FIG. 2 is a cross-sectional view near a bearing on the opposite side of a hydraulic pump as shown in FIG. 1. FIG. 3A is a front view of a wave washer. FIG. 3B is a cross-sectional view of FIG. 3A taken along the line A—A. In the followings, the same or like parts are designated by the same numerals. In the figures, the electro-hydraulic power steering apparatus 1 has arranged axially and integrally a motor 2 that includes a brushless motor, a control circuit 3 for controlling excitation of the motor 2, and a hydraulic pump 4 driven by the motor 2.

The motor 2 has a stator 6 pressed securely into an inner circumferential face of a frame 5 made from a steel plate, and a rotor 7 disposed with a certain gap between the inner circumferential face of the stator 6 and the rotor. The rotor 7 has a bearing 9 on the side of the hydraulic pump 4 in which an outer ring is securely pressed into a housing 8 made of aluminum, and a bearing 10 on the opposite side of the hydraulic pump on the frame 5. The rotor 7 is rotatably borne by the bearings 9 and 10.

The stator 6 has a bobbin 12 molded of nylon mounted and insulated in a core 11 having the electromagnetic steel sheets laminated, with a stator coil 13 wound around the bobbin 12. A plurality of coil terminals 13a in the stator coil 13 are placed in a predetermined connection (e.g., three phase delta connection) by a coil connector 14 disposed on a side portion of the stator 6. A connecting terminal 15 extending from the coil connector 14 is connected to a control circuit 3 received in the housing 8a made of aluminum, and the stator coil 13 is fed with electric power via the connecting terminal 15 from the control circuit 3.

The rotor 7 comprises a yoke portion 17 making up an iron core formed integrally around the rotational shaft 16, with a ferrite magnet 18 being bonded onto an outer circumferential face of the yoke portion 17 by an adhesive. The bearing 10 on the opposite side of the hydraulic pump has an annular O-ring 20 having a circular section and made of nitrile rubber in a groove portion 19 provided on the outer ring, with an inner ring press fit into the rotational shaft 16. The frame 5 is integrally formed with a receiving portion 21 for receiving the bearing 10, in which the inner diameter of the receiving portion 21 is slightly larger than the outer diameter of an outer wheel of the bearing 10, with a small gap permitting the assembling of the bearing 10 into the receiving portion 21. The O-ring 20 is compressed and disposed between the inner circumferential face of the receiving portion 21 and the outer ring of the bearing 10, the rotor 7 being resiliently supported. The bearing 10 is assembled into the receiving portion 21 with a grease coated on the outer ring of the bearing 10.

A wave washer 22 formed from a spring steel plate in a waveform and having elasticity is disposed in an axial gap between the outer ring of the bearing 10 and the receiving portion 21. The wave washer 22 presses the outer ring of the bearing 10, and the rotational shaft 16 via the bearing 10 toward the hydraulic pump 4. The bearing 9 has a larger bearing size than the bearing 10, in which the inner ring of the bearing 9 is secured to the rotational shaft 16. Accordingly, if the outer ring of the bearing 10 is pressed by the wave washer 22, a backlash due to bearing inside gaps of the bearings 9 and 10 is axially compressed and roughly removed.

The rotational shaft 16 extends from the bearing 9 via the control circuit 3 to the hydraulic pump 4, in which a pawl portion 23 provided integrally at the end of the rotational shaft 16 is coupled with the hydraulic pump 4 by an Oldham's coupling. A housing 8b made of aluminum on the side of the hydraulic pump 4 and a housing 8a for the control circuit 3 are fitted together with the housing 8 of the motor 2, and securely integrated by a clamp screw 24. A gear of the hydraulic pump 4 is driven by a rotational force of the rotational shaft 16 to generate a certain hydraulic pressure.

The control circuit 3 received within the housing 8a detects the polarity of a sensor magnet 25 rotating along with the rotational shaft 16 using a hall element, not shown, opposed to the sensor magnet 25 and provided in the control circuit 3, and discriminates the polarity of a magnet 18 of the rotor 7 to energize the stator coil 13 in a predetermined way.

The operation of the electro-hydraulic power steering apparatus in the embodiment 1 will be now described. The control circuit 3 detects the polarity of the sensor magnet 25, and energizes the stator coil 13 via the connecting terminal 15, so that the rotational shaft 16 is rotated owing to an electromagnetic action with the magnet 18 provided in the rotor 7 to cause the hydraulic pump 4 to be driven via the pawl portion 23 by its rotational force, whereby the driver is assisted with a steering force by its hydraulic pressure. For the electro-hydraulic power steering apparatus 1, the motor for use with 12V, about 50 to 100 A and about 4000 r/min is particularly required to have safety, responsibility, small size and high performance, and be silent and inexpensive.

The electro-hydraulic power steering apparatus 1 as constituted above comprises the motor 2, and the hydraulic pump 4 disposed at one end of the rotational shaft 16 for the motor 2 and driven by the motor 2, in which the bearing 10 rotatably bearing the rotational shaft 16 is resiliently supported via the O-ring 20 in the receiving portion 21, and the outer ring of the bearing 10 is resiliently pressed in the axial direction up to the wave washer 22 to force the rotational shaft 16 toward the hydraulic pump 4. Therefore, the noise of the electro-hydraulic power steering apparatus 1 due to pulsating hydraulic pressures is suppressed effectively, whereby the electro-hydraulic power steering apparatus 1 is produced with a simple constitution and cheaply.

Particularly, though the noise of the elecro-hydraulic power steering 1 might be increased by pulsating hydraulic pressures because of the existence of a backlash due to a gap in the receiving portion 21 and a backlash due to inside gaps of the bearings 9 and 10, the occurrence or propagation of the noise is suppressed by the O-ring 20 that resiliently supports the bearing. Moreover, since the bearing is resiliently pressed in the axial direction by the wave washer 22, the backlash due to bearing inside gaps of the bearings 9 and 10 is reduced to suppress the occurrence or propagation of the noise due to resiliency, thereby making the life of the bearing longer. In the conventional electric power steering apparatus, because the use of the wave washer 22 increases a loss torque, it is apprehended that the steering wheel of the vehicle is badly restored. However, in the electro-hydraulic power steering apparatus 1, it does not occur that the steering wheel is badly restored due to an increased loss torque, whereby the constitution is made suitable for the electro-hydraulic power steering apparatus 1.

Also, because the control circuit 3 for controlling excitation of the motor 2 is integrally provided between the motor 2 and the hydraulic pump 4, the rotational shaft 16 is longer from the bearing 9 to the hydraulic pump 4 to possibly aggravate the concentricity of the rotational shaft 16. Consequently, a deflection of the rotational shaft 16 on the side of the hydraulic pump 4 is increased to have a greater influence on the side of the bearing 10 and further generate the noise. However, owing to the O-ring 20 and the wave washer 22, the occurrence or propagation of the noise is effectively suppressed, and the life of the bearing is longer, whereby the electro-hydraulic power steering apparatus 1 with low noise, small size and high performance is obtained.

Also, of the two bearings 9 and 10 bearing the rotational shaft 16 of the motor 2, the bearing 9 on the side of the hydraulic pump has a larger bearing size than the bearing 10 on the opposite side of the hydraulic pump, so that the bearing inside gap of the bearing 9 is larger than that of the bearing 10 to further increase the noise. However, because of the O-ring 20 and the wave washer 22, the occurrence or propagation of the noise is effectively suppressed, whereby the electro-hydraulic power steering apparatus 1 with low noise and longer life of the bearing is obtained.

Also, there is a gap between the outer diameter of the bearing 10 on the opposite side of the hydraulic pump and the inner diameter of the receiving portion 21 for receiving the bearing 10, and the bearing 10 is resiliently supported via the O-ring 20 in the gap, the outer ring of the bearing 10 being resiliently pressed in the axial direction by the wave washer 22, whereby the electro-hydraulic power steering apparatus 1 is produced in which the occurrence or propagation of the noise is effectively suppressed with a simple constitution, and the bearing 10 is easily assembled into the receiving portion 21.

Figure 4A:
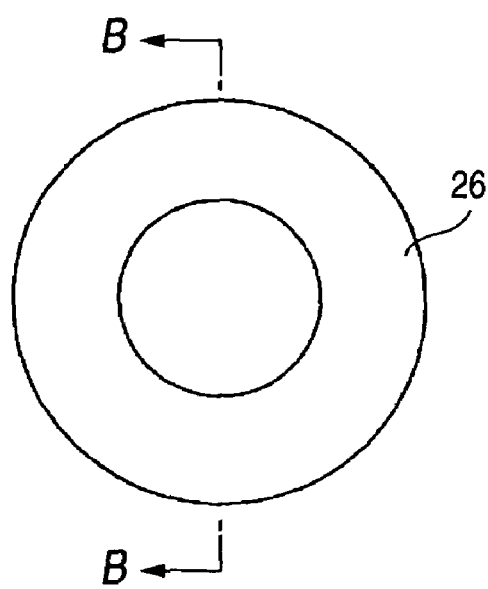
FIGS. 4A and 4B are a front view and a cross-sectional view of a disc spring according to the embodiment 1 of the invention.
Figure 4B:

Also, since the wave washer 22 is employed as the elastic body for pressing the bearing 10 in the axial direction, the constitution is easily and cheaply realized with excellent heat resistance. FIG. 4A is a front view of a disc spring. FIG. 4B is a cross-sectional view of FIG. 4A taken along the line B—B. The disc spring 26 formed from a spring steel plate may be substituted for the wave washer 22, but since the disc spring 26 has typically a higher rigidity than the wave washer 22 and has an angular portion on the abutment face, there is likely to occur an abrasion when the disc spring 26 without being sintered contacts an inner wall face of the receiving portion 21. Therefore, the wave washer 22 is preferably employed.

Embodiment 2

Figure 5:
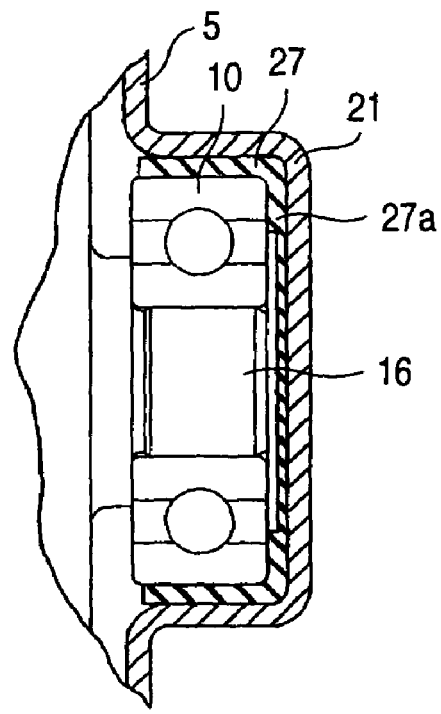
FIG. 5 is a cross-sectional view of the essence near a bearing on the opposite side of a hydraulic pump according to an embodiment 2 of the invention.

FIG. 5 is a cross-sectional view near a bearing on the opposite side of a hydraulic pump according to an embodiment 2 of the invention. In FIG. 5, the bearing 10 on the opposite side of the hydraulic pump has its inner ring press fit into the rotational shaft 16, a rubber bush 27 made of nitrile rubber and like a cap to serve as an elastic body is compressed and disposed between an outer ring of the bearing 10 and an inner circumferential face of a receiving portion 21 formed integrally in a frame 5 to resiliently bear the bearing 10. Moreover, the rubber bush 27 is compressed and disposed between the outer ring of the bearing 10 and the receiving portion 21 in the axial direction, and has a jaw portion 27a for resiliently pressing the outer ring of the bearing 10 in the axial direction. Other constitution is the same as in the embodiment 1.

The embodiment 2 as constituted above provides the same effect of the embodiment 1. Particularly, the rubber bush 27 has integrally formed an elastic body bearing the bearing 10 and an elastic body pressing the bearing 10 in the axial direction, whereby the number of parts is reduced and the assembling ability is improved. Also, because of the rubber bush 27, there is a greater effect of reducing the propagation of the noise as compared with the metallic elastic body such as the wave washer 22. However, when the electro-hydraulic power steering apparatus 1 is employed under the atmosphere of high temperatures such as near the engine or exhaust tube, not shown, the wave washer 22 has a less deteriorated pressing force, thereby providing the effect of reducing the noise for a long time.

Embodiment 3

Figure 6:
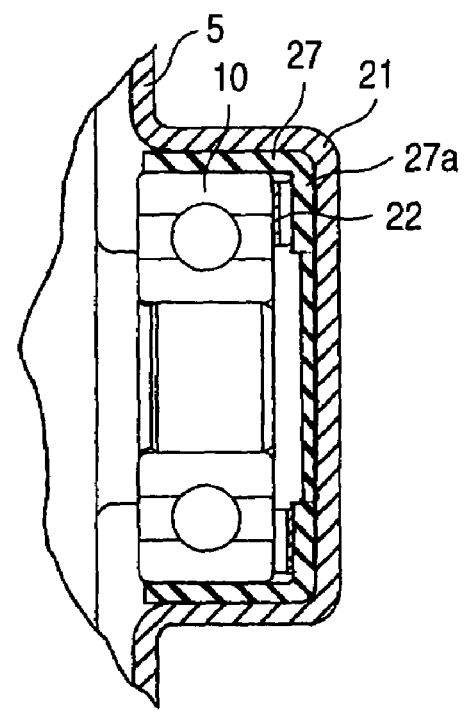
FIG. 6 is a cross-sectional view of the essence near a bearing on the opposite side of a hydraulic pump according to an embodiment 3 of the invention.

FIG. 6 is a cross-sectional view near a bearing on the opposite side of a hydraulic pump according to an embodiment 3 of the invention. In FIG. 6, a wave washer 22 is disposed between a jaw portion 27a of a rubber bush 27 and an outer ring of a bearing 10, whereby the outer ring of the bearing 10 is resiliently pressed in the axial direction by the wave washer 22 and the jaw portion 27a, in contrast to FIG. 5. Other constitution is the same as in the embodiments 1 and 2.

The embodiment 3 as constituted above provides the same effect of the embodiments 1 and 2. Particularly, the wave washer 22 serving as an elastic body presses the bearing 10 via the jaw portion 27a of the rubber bush 27 serving as the elastic body in the axial direction, whereby the propagation of the noise from the bearing 10 to a receiving portion 21 is further suppressed, and the noise is reduced. The bearing 10 has the wave washer 22 placed, covered with the rubber bush 27 and assembled into the receiving portion 21, enhancing the assembling ability. Though the disc spring 24 may be employed instead of the wave washer 22, the wave washer 22 contacts with the jaw portion 25 in a plane, and has a smaller bearing stress on the contact portion than the disc spring 24 having an angular portion, whereby the propagation of the noise is effectively reduced, and a crack is less likely to occur in the rubber bush 27, providing the effect of reducing the noise for a long time.

As described above, with this invention, there is provided an electro-hydraulic power steering apparatus comprising a motor having a rotational shaft and provided with a bearing for rotatably bearing the rotational shaft, and a hydraulic pump disposed at one end of the rotational shaft of the motor and driven by the motor, characterized in that the bearing is supported via an elastic body and pressed in an axial direction by the elastic body. Thereby, the noise of the electro-hydraulic power steering apparatus is effectively reduced with a simple constitution, and the electro-hydraulic power steering apparatus with low noise is obtained cheaply.

What is claimed is:

1. An electro-hydraulic power steering apparatus comprising:
    a motor having a rotational shaft and provided with a first bearing for rotatably bearing the rotational shaft;
    a hydraulic pump disposed at one end of the rotational shaft of the motor and driven by the motor, so as to provide a steering force for the electro-hydraulic power steering apparatus;
    a first elastic body for supporting the first bearing;
    a second elastic body for pressing the first bearing in an axial direction; and
    a control circuit for controlling excitation of the motor, the control circuit disposed between the motor and the hydraulic pump,
    wherein the first elastic body and the second elastic body are separate elements.

2. The electro-hydraulic power steering apparatus according to claim 1, wherein a plurality of bearings are provided comprising a second bearing on a side of the shaft having the hydraulic pump, and the first bearing, which is disposed opposite the hydraulic pump; and
    the second bearing has a larger size than the first bearing.

3. The electro-hydraulic power steering apparatus according to claim 1, wherein the first bearing is disposed on the shaft opposite the hydraulic pump, the first bearing having an outer ring;
    the first bearing is accommodated by a receiving portion, defining a gap between an outer diameter of the first bearing and an inner diameter of the receiving portion; and
    the gap accommodates the first elastic body and the second elastic body, said second elastic body presses the outer ring in the axial direction.

4. The electro-hydraulic power steering apparatus according to claim 1, wherein the second elastic body includes at least one of a wave washer and a disc spring.

5. The electro-hydraulic power steering apparatus according to claim 4, wherein the second elastic body further includes an elastic body for pressing at least one of the wave washer and the disc spring in the axial direction.

6. The electro-hydraulic power steering apparatus according to claim 1, wherein the first elastic body is an o-ring and the second elastic body is a wave washer.

7. The electro-hydraulic power steering apparatus according to claim 1, wherein the first bearing is disposed on an end of the shaft opposite the hydraulic pump, such that the second elastic body exerts an axial force on the bearing in a direction towards the hydraulic pump.

* * * * *